(12) United States Patent
Rogers

(10) Patent No.: US 12,339,372 B1
(45) Date of Patent: Jun. 24, 2025

(54) SYSTEMS AND METHODS FOR LIDAR SENSOR SYSTEMS WITH HIGH RESOLUTION SCANNING

(71) Applicant: Aurora Operations, Inc., Mountain View, CA (US)

(72) Inventor: Evan Rogers, Bozeman, MT (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 86 days.

(21) Appl. No.: 17/898,134

(22) Filed: Aug. 29, 2022

(51) Int. Cl.
| | |
|---|---|
| *G01S 17/931* | (2020.01) |
| *B60W 10/18* | (2012.01) |
| *B60W 10/20* | (2006.01) |
| *B60W 30/09* | (2012.01) |
| *B60W 30/095* | (2012.01) |
| *B60W 60/00* | (2020.01) |
| *G01S 7/481* | (2006.01) |
| *G01S 17/58* | (2006.01) |

(52) U.S. Cl.
CPC .......... *G01S 17/931* (2020.01); *B60W 10/18* (2013.01); *B60W 10/20* (2013.01); *B60W 30/09* (2013.01); *B60W 30/0956* (2013.01); *B60W 60/0015* (2020.02); *G01S 7/4815* (2013.01); *G01S 17/58* (2013.01); *B60W 2420/408* (2024.01); *B60W 2554/404* (2020.02)

(58) Field of Classification Search
CPC ...... G01S 17/931; G01S 7/4815; G01S 17/58; B60W 10/18; B60W 10/20; B60W 30/09; B60W 30/0956; B60W 60/0015; B60W 2420/408; B60W 2554/404
See application file for complete search history.

(56) References Cited

U.S. PATENT DOCUMENTS

| | | | | |
|---|---|---|---|---|
| 2021/0373137 | A1* | 12/2021 | Tan | G02B 26/023 |
| 2022/0075044 | A1* | 3/2022 | Michaels | G01S 7/4917 |
| 2022/0091240 | A1* | 3/2022 | Haslim | B60W 60/00272 |
| 2022/0099839 | A1* | 3/2022 | Morelli | G02B 27/283 |
| 2023/0204730 | A1* | 6/2023 | Yu | G01S 7/487 |
| | | | | 356/4.01 |

* cited by examiner

*Primary Examiner* — Aniss Chad
*Assistant Examiner* — Christine Nguyen Huynh
(74) *Attorney, Agent, or Firm* — Dority & Manning, P.A.

(57) ABSTRACT

A light detection and ranging (LIDAR) system includes a transmitter, a first receiver, a second receiver, and one or more processors. The transmitter is configured to output a transmit beam. The first receiver is positioned on a first side of the transmitter and is configured to receive a first component of a return beam from reflection of the transmit beam by an object. The second receiver is positioned on a second side of the transmitter and is configured to receive a second component of the return beam. The one or more processors are configured to determine at least one of a range to the object or a velocity of the object and control operation of the autonomous vehicle based on the at least one of the range or the velocity.

19 Claims, 10 Drawing Sheets

SYSTEMS AND METHODS FOR LIDAR SENSOR SYSTEMS WITH HIGH RESOLUTION SCANNING

BACKGROUND

Optical detection of range using lasers, often referenced by a mnemonic, LIDAR (for "light detection and ranging"), also sometimes referred to as "laser RADAR," is used for a variety of applications, including imaging and collision avoidance. LIDAR provides finer scale range resolution with smaller beam sizes than conventional microwave ranging systems, such as radio-wave detection and ranging (RADAR).

SUMMARY

At least one aspect relates to a light detection and ranging (LIDAR) system. The LIDAR system includes a transmitter configured to output a transmit beam. The LIDAR system includes a first receiver on a first side of the transmitter. The first receiver configured to receive a first component of a return beam from reflection of the transmit beam by an object. The LIDAR system includes a second receiver on a second side of the transmitter. The second receiver configured to receive a second component of the return beam. The LIDAR system includes one or more processors. The one or more processors configured to determine at least one of a range to the object or a velocity of the object based on the first component and the second component.

At least one aspect relates to an autonomous vehicle control system. The autonomous vehicle control system includes a transmitter, a first receiver, a second receiver, and one or more processors. The transmitter configured to output a transmit beam. The first receiver is positioned on a first side of the transmitter. The first receiver configured to receive a first component of a return beam from reflection of the transmit beam by an object. The second receiver is positioned on a second side of the transmitter. The second receiver configured to receive a second component of the return beam. The one or more processors configured to determine at least one of a range to the object or a velocity of the object and control operation of the autonomous vehicle based on the at least one of the range or the velocity.

At least one aspect relates to an autonomous vehicle. The autonomous vehicle includes a LIDAR sensor system including a transmitter, a first receiver, a second receiver, and one or more processors. The transmitter configured to output a transmit beam. The first receiver is positioned on a first side of the transmitter. The first receiver configured to receive a first component of a return beam from reflection of the transmit beam by an object. The second receiver is positioned on a second side of the transmitter. The second receiver configured to receive a second component of the return beam. The one or more processors configured to determine at least one of a range to the object or a velocity of the object based on the first component and the second component. The autonomous vehicle includes a steering system, a braking system, and a vehicle controller. The vehicle controller configured to control operation of at least one of the steering system or the braking system based on the at least one of the range or the velocity.

Those skilled in the art will appreciate that the summary is illustrative only and is not intended to be in any way limiting. Any of the features described herein may be used with any other features, and any subset of such features can be used in combination according to various embodiments.

Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Implementations are illustrated by way of example, and not by way of limitation, in the figures of the accompanying drawings in which like reference numerals refer to similar elements and in which.

DETAILED DESCRIPTION

Figure 1:
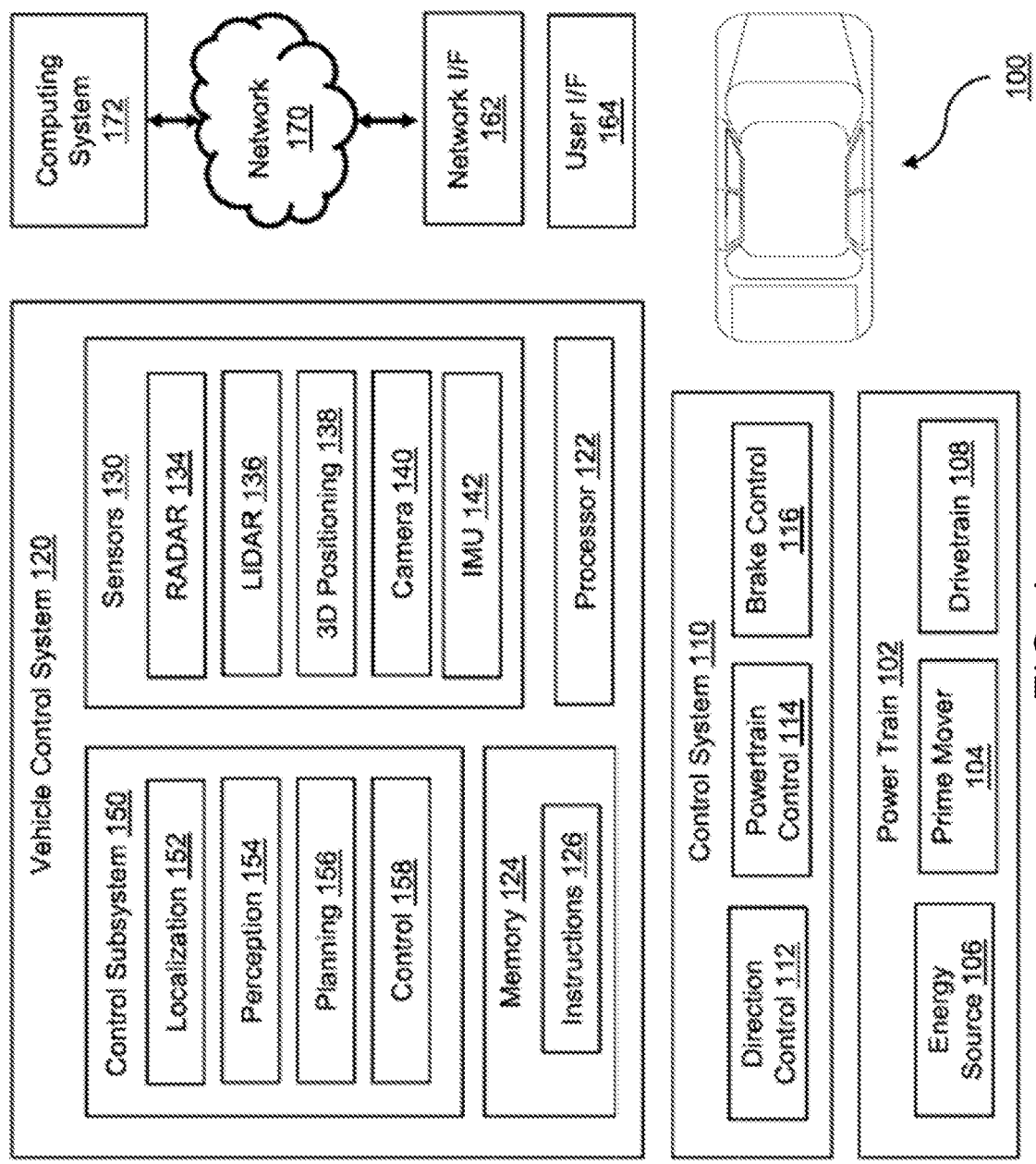
FIG. 1 is a block diagram of an example of a system environment for autonomous vehicles.

A LIDAR sensor system can generate and transmit a light beam that an object can reflect or otherwise scatter as a return beam corresponding to the transmitted beam. The LIDAR sensor system can receive the return beam, and process the return beam or characteristics thereof to determine parameters regarding the object such as range and velocity. The LIDAR sensor system can apply various frequency or phase modulations to the transmitted beam, which can facilitate relating the return beam to the transmitted beam in order to determine the parameters regarding the object.

The LIDAR sensor system can include a transmitter, a first receiver, a second receiver, and one or more processors. The transmitter configured to output a transmit beam. The first receiver is positioned on a first side of the transmitter. The first receiver configured to receive a first component of a return beam from reflection of the transmit beam by an object. The second receiver is positioned on a second side of the transmitter. The second receiver configured to receive a second component of the return beam. The transmit beam can be scanned over a field of view to be reflected or otherwise scattered by an object as the return beam, which can be used to determine range, velocity, and Doppler information regarding the object, such as for controlling operation of an autonomous vehicle. The one or more processors can be configured to determine at least one of a range to the object or a velocity of the object and control operation of the autonomous vehicle based on the at least one of the range or the velocity.

Systems and methods in accordance with the present disclosure can implement LIDAR sensor systems in which a particular transmitter that outputs a transmit beam is not necessarily adjacent to the corresponding receiver(s) used to receive return beam from reflection of the transmit beam, such as by interleaving multiple receivers and transmitters of multiple channels. These arrangements can allow for the spacing between the transmitters to be decreased and the spacing between a transmitter and the corresponding receivers to be set in a more effective manner. With the spacing between the transmitters decreased, more scan lines associated with the transmit beams outputted from the transmitters can be provided in a particular portion of the field of view, which can be referred to as block scanning. This can reduce the likelihood that only a single scan line falls on an object in the particular portion of the field of view. As such, small object perception of the scanner is improved and the size of the object can be easier to identify without significant reductions in signal to noise ratio. The spacing between a particular transmitter and the corresponding receivers can be decreased, which can allow for the thickness of a displacer used as part of an optical module between the particular transmitter and scanning optics to be reduced. The advantages of the scan pattern described above are not limited to autonomous vehicles. They can be advantageous for any type of vehicles equipped with LIDAR sensors.

1. System Environments for Autonomous Vehicles

FIG. 1 is a block diagram illustrating an example of a system environment for autonomous vehicles according to some implementations. FIG. 1 depicts an example autonomous vehicle 100 within which the various techniques disclosed herein may be implemented. The vehicle 100, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 100 may be implemented as any number of different types of vehicles, including vehicles capable of transporting people and/or cargo, and capable of traveling in various environments. The aforementioned components 102-116 can vary widely based upon the type of vehicle within which these components are utilized, such as a wheeled land vehicle such as a car, van, truck, or bus. The prime mover 104 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 108 can include wheels and/or tires along with a transmission and/or any other mechanical drive components to convert the output of the prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of the vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 112 may include one or more actuators and/or sensors for controlling and receiving feedback from the direction or steering components to enable the vehicle 100 to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 100. The brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment, may utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers.

Various levels of autonomous control over the vehicle 100 can be implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)") and/or central processing unit(s) ("CPU(s)").

Sensors 130 may include various sensors suitable for collecting information from a vehicle's surrounding environment for use in controlling the operation of the vehicle. For example, sensors 130 can include radar sensor 134, LIDAR (Light Detection and Ranging) sensor 136, a 3D positioning sensors 138, e.g., any of an accelerometer, a gyroscope, a magnetometer, or a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 100. Each sensor 130 can output sensor data at various data rates, which may be different than the data rates of other sensors 130.

The outputs of sensors 130 may be provided to a set of control subsystems 150, including a localization subsystem 152, a planning subsystem 156, a perception subsystem 154, and a control subsystem 158. The localization subsystem 152 can perform functions such as precisely determining the location and orientation (also sometimes referred to as "pose") of the vehicle 100 within its surrounding environment, and generally within some frame of reference. The location of an autonomous vehicle can be compared with the location of an additional vehicle in the same environment as part of generating labeled autonomous vehicle data. The perception subsystem 154 can perform functions such as detecting, tracking, determining, and/or identifying objects within the environment surrounding vehicle 100. A machine learning model in accordance with some implementations can be utilized in tracking objects. The planning subsystem 156 can perform functions such as planning a trajectory for vehicle 100 over some timeframe given a desired destination as well as the static and moving objects within the environment. A machine learning model in accordance with some implementations can be utilized in planning a vehicle trajectory. The control subsystem 158 can perform functions such as generating suitable control signals for controlling the various controls in the vehicle control system 120 in order to implement the planned trajectory of the vehicle 100. A machine learning model can be utilized to generate one or more signals to control an autonomous vehicle to implement the planned trajectory.

Multiple sensors of types illustrated in FIG. 1 can be used for redundancy and/or to cover different regions around a vehicle, and other types of sensors may be used. Various types and/or combinations of control subsystems may be used. Some or all of the functionality of a subsystem 152-158 may be implemented with program code instructions 126 resident in one or more memories 124 and executed by one or more processors 122, and these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 100 may also include a secondary vehicle control system (not illustrated), which may be used as a redundant or backup control system for the vehicle 100. In some implementations, the secondary vehicle control system may be capable of fully operating the autonomous vehicle 100 in the event of an adverse event in the vehicle control system 120, while in other implementations, the secondary vehicle control system may only have limited functionality, e.g., to perform a controlled stop of the vehicle 100 in response to an adverse event detected in the primary vehicle control system 120. In still other implementations, the secondary vehicle control system may be omitted.

Various architectures, including various combinations of software, hardware, circuit logic, sensors, and networks, may be used to implement the various components illustrated in FIG. 1. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 100, e.g., any cache memory in a processor, as well as any storage capacity used as a virtual memory, e.g., as stored on a mass storage device or another computer controller. One or more processors illustrated in FIG. 1, or entirely separate processors, may be used to implement additional functionality in the vehicle 100 outside of the purposes of autonomous control, e.g., to control entertainment systems, to operate doors, lights, convenience features, etc.

In addition, for additional storage, the vehicle 100 may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 100 may include a user interface 164 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, the vehicle 100 may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 100 receives environmental and other data for use in autonomous control thereof. Data collected by the one or more sensors 130 can be uploaded to a computing system 172 via the network 170 for additional processing. In some implementations, a time stamp can be added to each instance of vehicle data prior to uploading.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code can include one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. Any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), the present disclosure is not limited to the specific organization and allocation of program functionality described herein.

2. LIDAR for Automotive Applications

Figure 5:
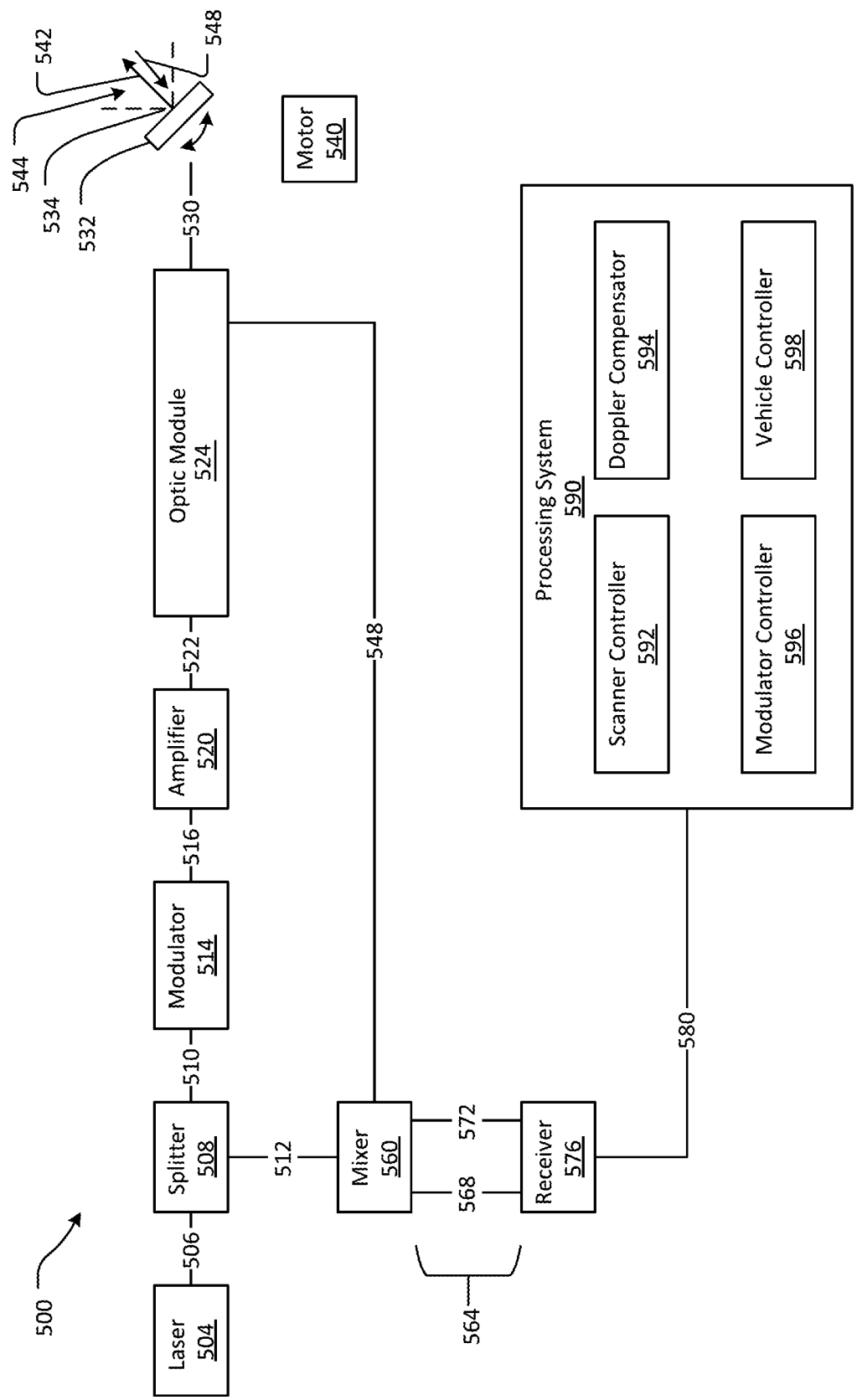
FIG. 5 is a block diagram of an example of a LIDAR sensor system.

A truck can include a LIDAR system (e.g., vehicle control system 120 in FIG. 1, LIDAR sensor system 500 in FIG. 5, among others described herein). In some implementations, the LIDAR sensor system 500 can use frequency modulation to encode an optical signal and scatter the encoded optical signal into free-space using optics. By detecting the frequency differences between the encoded optical signal and a returned signal reflected back from an object, the frequency modulated (FM) LIDAR sensor system can determine the location of the object and/or precisely measure the velocity of the object using the Doppler effect. In some implementations, an FM LIDAR sensor system may use a continuous wave (referred to as, "FMCW LIDAR") or a quasi-continuous wave (referred to as, "FMQW LIDAR"). In some implementations, the LIDAR sensor system can use phase modulation (PM) to encode an optical signal and scatters the encoded optical signal into free-space using optics.

In some instances, an object (e.g., a pedestrian wearing dark clothing) may have a low reflectivity, in that it only reflects back to the sensors (e.g., sensors 130 in FIG. 1) of the FM or PM LIDAR sensor system a low amount (e.g., 10% or less) of the light that hit the object. In other instances, an object (e.g., a shiny road sign) may have a high reflectivity (e.g., above 10%), in that it reflects back to the sensors of the FM LIDAR sensor system a high amount of the light that hit the object.

Regardless of the object's reflectivity, an FM LIDAR sensor system may be able to detect (e.g., classify, recognize, discover, etc.) the object at greater distances (e.g., 2×) than a conventional LIDAR sensor system. For example, an FM LIDAR sensor system may detect a low reflectively object beyond 300 meters, and a high reflectivity object beyond 400 meters.

To achieve such improvements in detection capability, the FM LIDAR sensor system may use sensors (e.g., sensors 130 in FIG. 1). In some implementations, these sensors can be single photon sensitive, meaning that they can detect the smallest amount of light possible. While an FM LIDAR sensor system may, in some applications, use infrared wavelengths (e.g., 950 nm, 1550 nm, etc.), it is not limited to the infrared wavelength range (e.g., near infrared: 800 nm-1500 nm; middle infrared: 1500 nm-5600 nm; and far infrared: 5600 nm-1,000,000 nm). By operating the FM or PM LIDAR sensor system in infrared wavelengths, the FM or PM LIDAR sensor system can broadcast stronger light pulses or light beams than conventional LIDAR sensor systems.

Thus, by detecting an object at greater distances, an FM LIDAR sensor system may have more time to react to unexpected obstacles. Indeed, even a few milliseconds of extra time could improve response time and comfort, especially with heavy vehicles (e.g., commercial trucking vehicles) that are driving at highway speeds.

The FM LIDAR sensor system can provide accurate velocity for each data point instantaneously. In some implementations, a velocity measurement is accomplished using the Doppler effect which shifts frequency of the light received from the object based at least one of the velocity in the radial direction (e.g., the direction vector between the object detected and the sensor) or the frequency of the laser signal. For example, for velocities encountered in on-road situations where the velocity is less than 100 meters per second (m/s), this shift at a wavelength of 1550 nanometers (nm) amounts to the frequency shift that is less than 130 megahertz (MHz). This frequency shift is small such that it is difficult to detect directly in the optical domain. However, by using coherent detection in FMCW, PMCW, or FMQW LIDAR sensor systems, the signal can be converted to the RF domain such that the frequency shift can be calculated using various signal processing techniques. This enables the autonomous vehicle control system to process incoming data faster.

Instantaneous velocity calculation also makes it easier for the FM LIDAR sensor system to determine distant or sparse data points as objects and/or track how those objects are moving over time. For example, an FM LIDAR sensor (e.g., sensors 130 in FIG. 1) may only receive a few returns (e.g., hits) on an object that is 300 m away, but if those return give a velocity value of interest (e.g., moving towards the vehicle at >70 mph), then the FM LIDAR sensor system and/or the autonomous vehicle control system may determine respective weights to probabilities associated with the objects.

Faster identification and/or tracking of the FM LIDAR sensor system gives an autonomous vehicle control system more time to maneuver a vehicle. A better understanding of how fast objects are moving also allows the autonomous vehicle control system to plan a better reaction.

The FM LIDAR sensor system can have less static compared to conventional LIDAR sensor systems. That is, the conventional LIDAR sensor systems that are designed to be more light-sensitive typically perform poorly in bright sunlight. These systems also tend to suffer from crosstalk (e.g., when sensors get confused by each other's light pulses or light beams) and from self-interference (e.g., when a sensor gets confused by its own previous light pulse or light beam). To overcome these disadvantages, vehicles using the conventional LIDAR sensor systems often need extra hardware, complex software, and/or more computational power to manage this "noise."

In contrast, FM LIDAR sensor systems do not suffer from these types of issues because each sensor is specially designed to respond only to its own light characteristics (e.g., light beams, light waves, light pulses). If the returning light does not match the timing, frequency, and/or wavelength of what was originally transmitted, then the FM sensor can filter (e.g., remove, ignore, etc.) out that data point. As such, FM LIDAR sensor systems produce (e.g., generates, derives, etc.) more accurate data with less hardware or software requirements, enabling smoother driving.

The FM LIDAR sensor system can be easier to scale than conventional LIDAR sensor systems. As more self-driving vehicles (e.g., cars, commercial trucks, etc.) show up on the road, those powered by an FM LIDAR sensor system likely will not have to contend with interference issues from sensor crosstalk. Furthermore, an FM LIDAR sensor system uses less optical peak power than conventional LIDAR sensors. As such, some or all of the optical components for an FM LIDAR can be produced on a single chip, which produces its own benefits, as discussed herein.

2.1 Commercial Trucking

Figure 2:
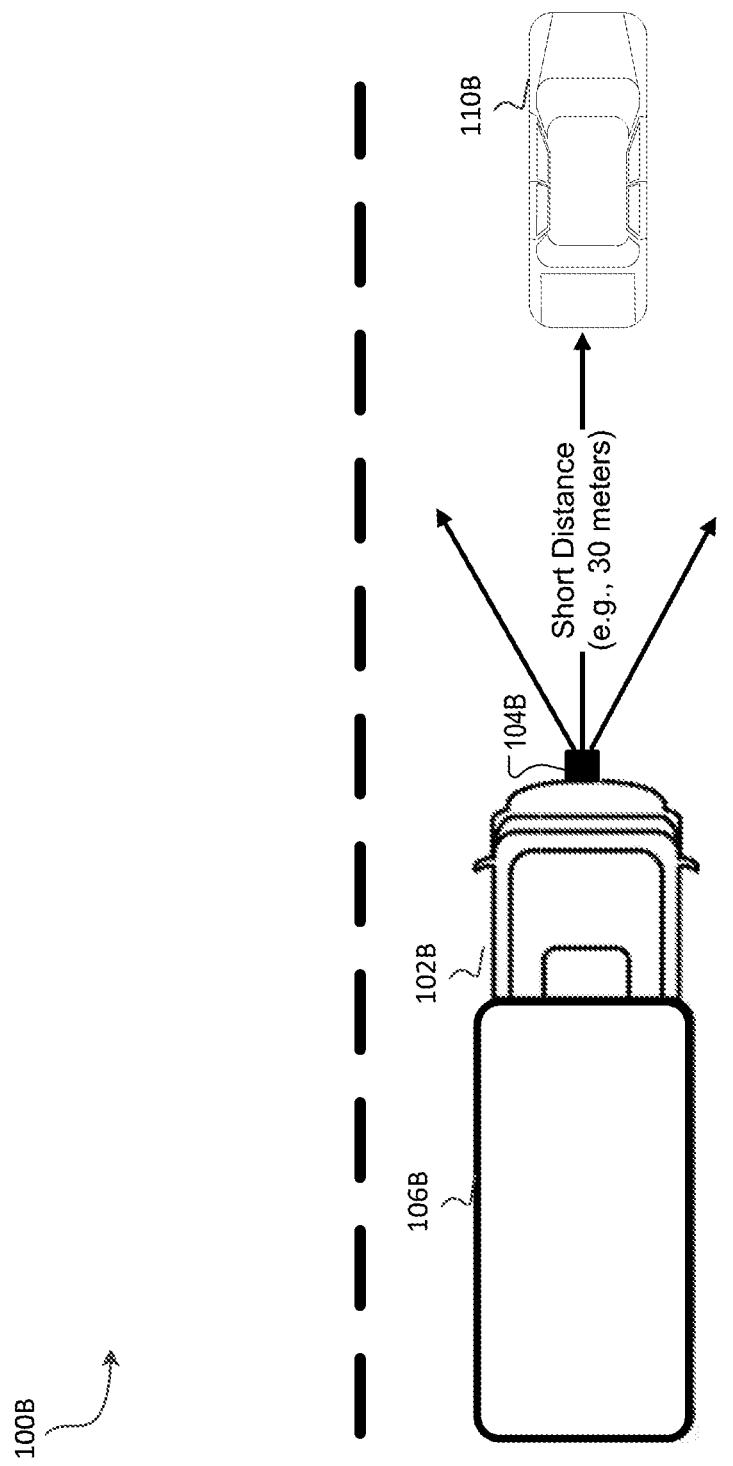
FIG. 2 is a block diagram of an example of a system environment for autonomous commercial trucking vehicles.

FIG. 2 is a block diagram illustrating an example of a system environment for autonomous commercial trucking vehicles, according to some implementations. The environment 100B includes a commercial truck 102B for hauling cargo 106B. In some implementations, the commercial truck 102B may include vehicles configured to long-haul freight transport, regional freight transport, intermodal freight transport (i.e., in which a road-based vehicle is used as one of multiple modes of transportation to move freight), and/or any other road-based freight transport applications. In some implementations, the commercial truck 102B may be a flatbed truck, a refrigerated truck (e.g., a reefer truck), a vented van (e.g., dry van), a moving truck, etc. In some implementations, the cargo 106B may be goods and/or produce. In some implementations, the commercial truck 102B may include a trailer to carry the cargo 106B, such as a flatbed trailer, a lowboy trailer, a step deck trailer, an extendable flatbed trailer, a sidekit trailer, etc.

The environment 100B includes an object 110B (shown in FIG. 2 as another vehicle) that is within a distance range that is equal to or less than 30 meters from the truck.

The commercial truck 102B may include a LIDAR sensor system 104B (e.g., an FM LIDAR sensor system, vehicle control system 120 in FIG. 1, LIDAR sensor system 500 in FIG. 5) for determining a distance to the object 110B and/or measuring the velocity of the object 110B. Although FIG. 2 shows that one LIDAR sensor system 104B is mounted on the front of the commercial truck 102n, the number of LIDAR sensor system and the mounting area of the LIDAR sensor system on the commercial truck are not limited to a particular number or a particular area. The commercial truck 102B may include any number of LIDAR sensor systems 104B (or components thereof, such as sensors, modulators, coherent signal generators, etc.) that are mounted onto any area (e.g., front, back, side, top, bottom, underneath, and/or bottom) of the commercial truck 102B to facilitate the detection of an object in any free-space relative to the commercial truck 102B.

As shown, the LIDAR sensor system 104B in environment 100B may be configured to detect an object (e.g., another vehicle, a bicycle, a tree, street signs, potholes, etc.) at short distances (e.g., 30 meters or less) from the commercial truck 102B.

Figure 3:
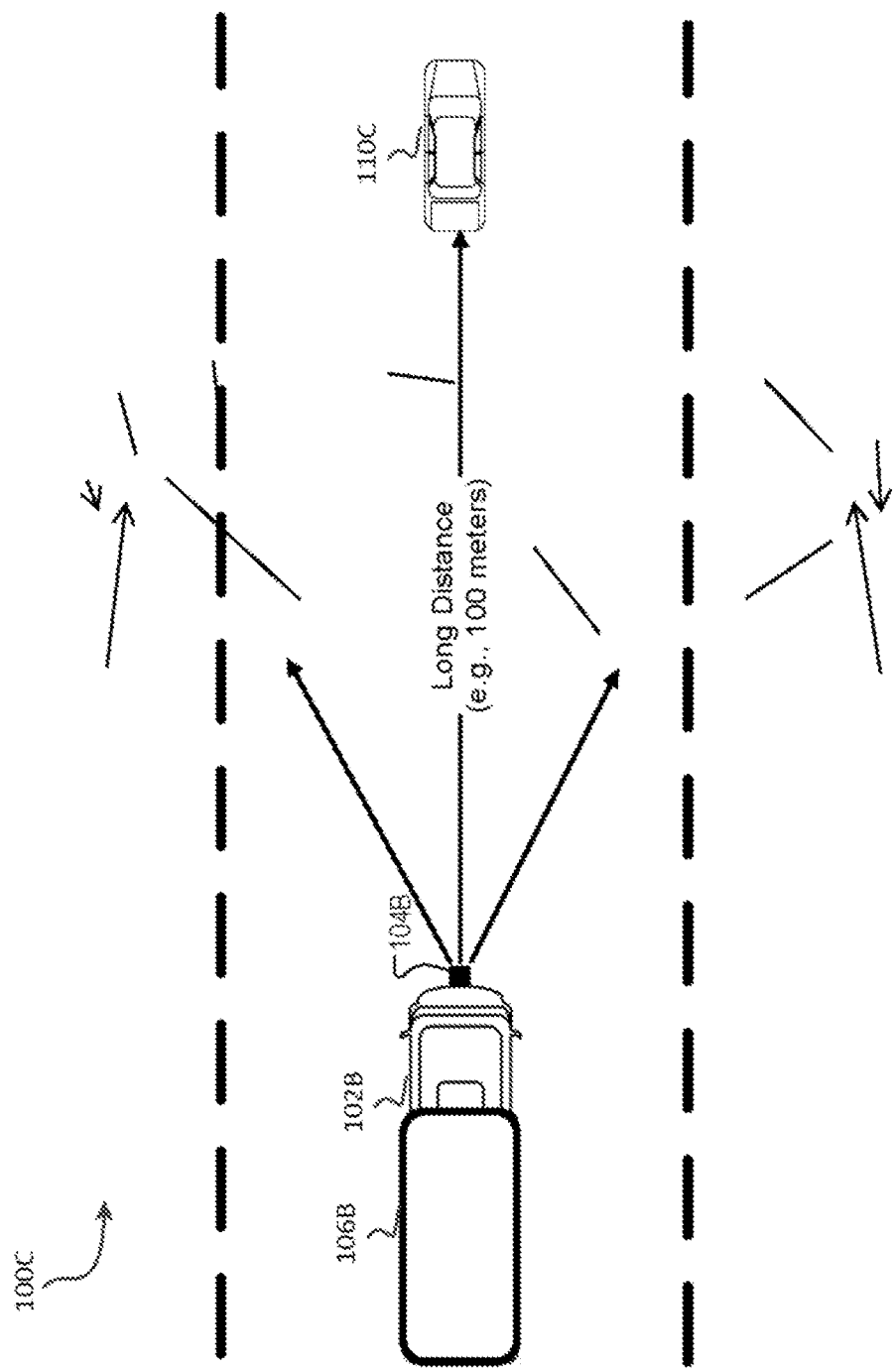
FIG. 3 is a block diagram of an example of a system environment for autonomous commercial trucking vehicles.

FIG. 3 is a block diagram illustrating an example of a system environment for autonomous commercial trucking vehicles, according to some implementations. The environment 100C includes the same components (e.g., commercial truck 102B, cargo 106B, LIDAR sensor system 104B, etc.) that are included in environment 100B.

The environment 100C includes an object 110C (shown in FIG. 3 as another vehicle) that is within a distance range that is (i) more than 30 meters and (ii) equal to or less than 150 meters from the commercial truck 102B. As shown, the LIDAR sensor system 104B in environment 100C may be configured to detect an object (e.g., another vehicle, a bicycle, a tree, street signs, potholes, etc.) at a distance (e.g., 100 meters) from the commercial truck 102B.

Figure 4:
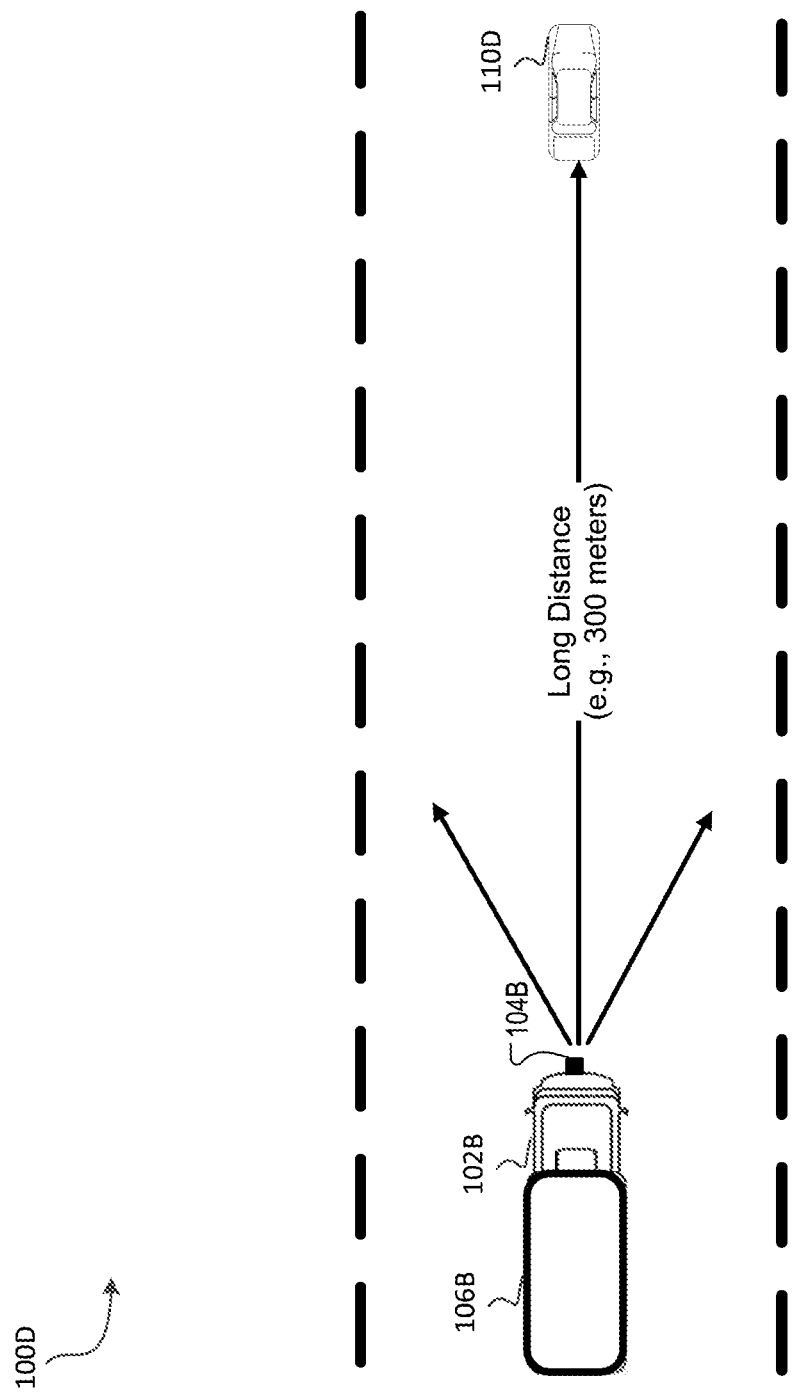
FIG. 4 is a block diagram of an example of a system environment for autonomous commercial trucking vehicles.

FIG. 4 is a block diagram illustrating an example of a system environment for autonomous commercial trucking vehicles, according to some implementations. The environment 100D includes the same components (e.g., commercial truck 102B, cargo 106B, LIDAR sensor system 104B, etc.) that are included in environment 100B.

The environment 100D includes an object 110D (shown in FIG. 4 as another vehicle) that is within a distance range that is more than 150 meters from the commercial truck 102B. As shown, the LIDAR sensor system 104B in environment 100D may be configured to detect an object (e.g., another vehicle, a bicycle, a tree, street signs, potholes, etc.) at a distance (e.g., 300 meters) from the commercial truck 102B.

In commercial trucking applications, it is important to effectively detect objects at all ranges due to the increased weight and, accordingly, longer stopping distance required for such vehicles. FM LIDAR sensor systems (e.g., FMCW and/or FMQW systems) or PM LIDAR sensor systems are well-suited for commercial trucking applications due to the advantages described above. As a result, commercial trucks equipped with such systems may have an enhanced ability to move both people and goods across short or long distances. In various implementations, such FM or PM LIDAR sensor systems can be used in semi-autonomous applications, in which the commercial truck has a driver and some functions of the commercial truck are autonomously operated using the FM or PM LIDAR sensor system, or fully autonomous applications, in which the commercial truck is operated entirely by the FM or LIDAR sensor system, alone or in combination with other vehicle systems.

3. LIDAR Sensor Systems

FIG. 5 depicts an example of a LIDAR sensor system 500. The LIDAR sensor system 500 can be used to determine parameters regarding objects, such as range and velocity, and output the parameters to a remote system. For example, the LIDAR sensor system 500 can output the parameters for use by a vehicle controller that can control operation of a vehicle responsive to the received parameters (e.g., vehicle controller 598) or a display that can present a representation of the parameters. The LIDAR sensor system 500 can be a coherent detection system. The LIDAR sensor system 500 can be used to implement various features and components of the systems described with reference to FIGS. 1-4. The LIDAR sensor system 500 can include components for performing various detection approaches, such as to be operated as an amplitude modular LIDAR system or a coherent LIDAR system. The LIDAR sensor system 500 can be used to perform time of flight range determination. In some implementations, various components or combinations of components of the LIDAR sensor system 500, such as laser source 504 and modulator 514, can be in a same housing, provided in a same circuit board or other electronic component, or otherwise integrated. In some implementations, various components or combinations of components of the LIDAR sensor system 500 can be provided as separate components, such as by using optical couplings (e.g., optical fibers) for components that generate and/or receive optical signals, such as light beams, or wired or wireless electronic connections for components that generate and/or receive electrical (e.g., data) signals. Various components of the LIDAR sensor system 500 can be arranged with respect to one another such that light (e.g., beams of light) between the components is directed through free space, such as a space provided by an air (or vacuum) gap, a space that is not through an optical fiber, a space that is free of structural components around a path along which the light is directed (e.g., an empty space at least on the order of millimeters away from a direct line path between the components; an empty space of a size greater than an expected beam width of the light, such as where the light is a collimated beam), or various combinations thereof.

The LIDAR sensor system 500 can include a laser source 504 that generates and emits a beam 506, such as a carrier wave light beam. A splitter 508 can split the beam 506 into a beam 510 and a reference beam 512 (e.g., reference signal). In some implementations, any suitable optical, electronic, or opto-electronic elements can be used to provide the beam 510 and the reference beam 512 from the laser source 504 to other elements.

A modulator 514 can modulate one or more properties of the input beam 510 to generate a beam 516 (e.g., target beam). In some implementations, the modulator 514 can modulate a frequency of the input beam 510 (e.g., optical frequency corresponding to optical wavelength, where c=λv, where c is the speed of light, λ is the wavelength, and v is the frequency). For example, the modulator 514 can modulate a frequency of the input beam 510 linearly such that a frequency of the beam 516 increases or decreases linearly over time. As another example, the modulator 514 can modulate a frequency of the input beam 510 non-linearly (e.g., exponentially). In some implementations, the modulator 514 can modulate a phase of the input beam 510 to generate the beam 516. However, the modulation techniques are not limited to the frequency modulation and the phase modulation. Any suitable modulation techniques can be used to modulate one or more properties of a beam. Returning to FIG. 5, the modulator 514 can modulate the beam 510 subsequent to splitting of the beam 506 by the splitter 508, such that the reference beam 512 is unmodulated, or the modulator 514 can modulate the beam 506 and provide a modulated beam to the splitter 508 for the splitter 508 to split into a target beam and a reference beam.

The beam 516, which is used for outputting a transmitted signal, can have most of the energy of the beam 506 outputted by the laser source 504, while the reference beam 512 can have significantly less energy, yet sufficient energy to enable mixing with a return beam 548 (e.g., returned light) scattered from an object. The reference beam 512 can be used as a local oscillator (LO) signal. The reference beam 512 passes through a reference path and can be provided to a mixer 560. An amplifier 520 can amplify the beam 516 to output a beam 522.

The LIDAR sensor system 500 can include an optics module 524, which can receive the beam 522. The optics module 524 can be a free space optic. For example, the optics module 524 can include one or more optics (e.g., lenses, mirrors, waveguides, grating couplers, prisms, waveplates) arranged to have a gap (e.g., air gap) between the one or more optics, allowing for free space transmission of light (e.g., rather than all light being coupled between optics by fibers). The optics module 524 can perform functions such as collimating, filtering, and/or polarizing the beam 522 to output a beam 530 to optics 532 (e.g., scanning optics).

Figure 6:
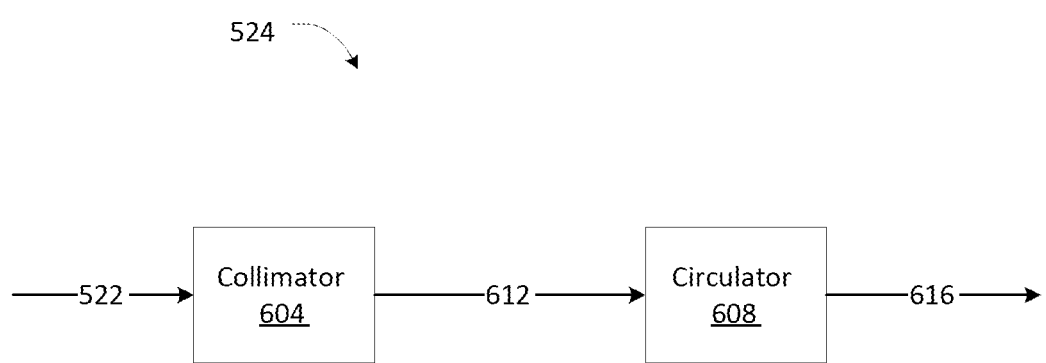
FIG. 6 is a block diagram of an example of an optic module of a LIDAR sensor system.

Referring to FIG. 6, the optics module 524 can include at least one collimator 604 and at least one circulator 608. For example, the circulator 608 can be between the collimator 604 and the optics 532 of FIG. 5. The circulator 608 can receive a collimated beam 612 outputted by the collimator 604 and output a beam 616 (e.g., the beam 530 depicted in FIG. 5) to the optics 532. In some implementations, the circulator 608 can be between the laser source 504 and the collimator 604. At least one of the collimator 604 or the circulator 608 can be free space optics (and can be coupled with one another in free space), such as by being optically coupled via air gaps rather than optical fibers.

Referring further to FIG. 5, the optics module 524 can receive return beam 548 from the optics 532 and provide the return beam 548 to the mixer 560. The optics 532 can be scanning optics, such as one or more steering mirrors or polygon reflectors or deflectors to adjust the angle of received beams relative to outputted beams based on the orientation of outer surfaces (e.g., facets) of the optics relative to the received beam, or solid-state components (e.g., phased arrays, electro-optic crystals) configured to modify the direction of received light.

The optics 532 can define a field of view 544 that corresponds to angles scanned (e.g., swept) by the beam 542 (e.g., a transmitted beam). For example, the beam 542 can be scanned in the particular plane, such as an azimuth plane or elevation plane (e.g., relative to an object to which the LIDAR sensor system 500 is coupled, such as an autonomous vehicle). The optics 532 can be oriented so that the field of view 544 sweeps an azimuthal plane relative to the optics 532.

At least one motor 540 can be coupled with the optics 532 to control at least one of a position or an orientation of the optics 532 relative to the beam 530. For example, where the optics 532 include a mirror, reflector, or deflector, the motor 540 can rotate the optics 532 relative to an axis 534 (e.g., an axis orthogonal to the frame of reference depicted in FIG. 5) so that surfaces of the optics 532 at which the beam 530 is received vary in angle or orientation relative to the beam 530, causing the beam 542 to be varied in angle or direction as the beam 542 is outputted from the optics 532.

The beam 542 can be outputted from the optics 532 and reflected or otherwise scattered by an object (not shown) as a return beam 548 (e.g., return signal). The return beam 548 can be received on a reception path, which can include the circulator 608, and provided to the mixer 560.

The mixer 560 can be an optical hybrid, such as a 90 degree optical hybrid. The mixer 560 can receive the reference beam 512 and the return beam 548, and mix the reference beam 512 and the return beam 548 to output a signal 564 responsive to the reference beam 512 and the return beam 548. The signal 564 can include an in-phase (I) component 568 and a quadrature (Q) component 572.

The LIDAR sensor system 500 can include a receiver 576 that receives the signal 564 from the mixer 560. The receiver 576 can generate a signal 580 responsive to the signal 564, which can be an electronic (e.g., radio frequency) signal. The receiver 576 can include one or more photodetectors that output the signal 580 responsive to the signal 564.

The LIDAR sensor system 500 can include a processing system 590, which can be implemented using features of the vehicle control system 120 described with reference to FIG. 1. The processing system 590 can process data received regarding the return beam 548, such as the signal 580, to determine parameters regarding the object such as range and velocity. The processing system 590 can include a scanner controller 592 that can provide scanning signals to control operation of the optics 532, such as to control the motor 540 to cause the motor 540 to rotate the optics 532 to achieve a target scan pattern, such as a sawtooth scan pattern or step function scan pattern. The processing system 590 can include a Doppler compensator 594 that can determine the sign and size of a Doppler shift associated with processing the return beam 548 and a corrected range based thereon along with any other corrections. The processing system 590 can include a modulator controller 596 that can send one or more electrical signals to drive the modulator 514.

The processing system 590 can include or be communicatively coupled with a vehicle controller 598 to control operation of a vehicle for which the LIDAR sensor system 500 is installed (e.g., to provide complete or semi-autonomous control of the vehicle). For example, the vehicle controller 598 can be implemented by at least one of the LIDAR sensor system 500 or control circuitry of the vehicle. The vehicle controller 598 can control operation of the vehicle responsive to at least one of a range to the object or a velocity of the object determined by the processing system 590. For example, the vehicle controller 598 can transmit a control signal to at least one of a steering system or a braking system of the vehicle to control at least one of speed or direction of the vehicle.

3.1 LIDAR Sensor Systems with High Resolution Scanning

Figure 7:
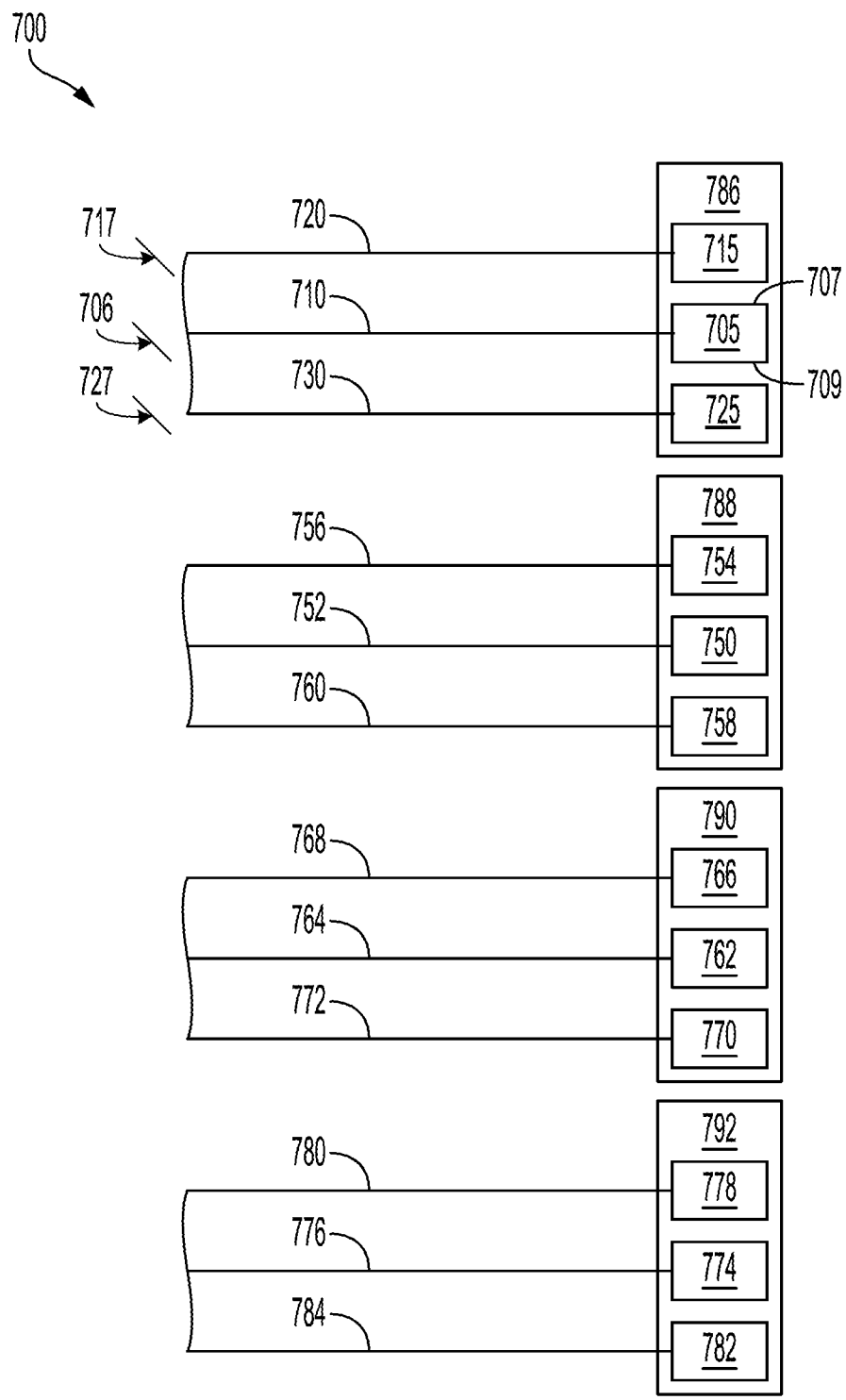
FIG. 7 is a block diagram of an example of a LIDAR sensor system to perform block scanning.
Figure 10:
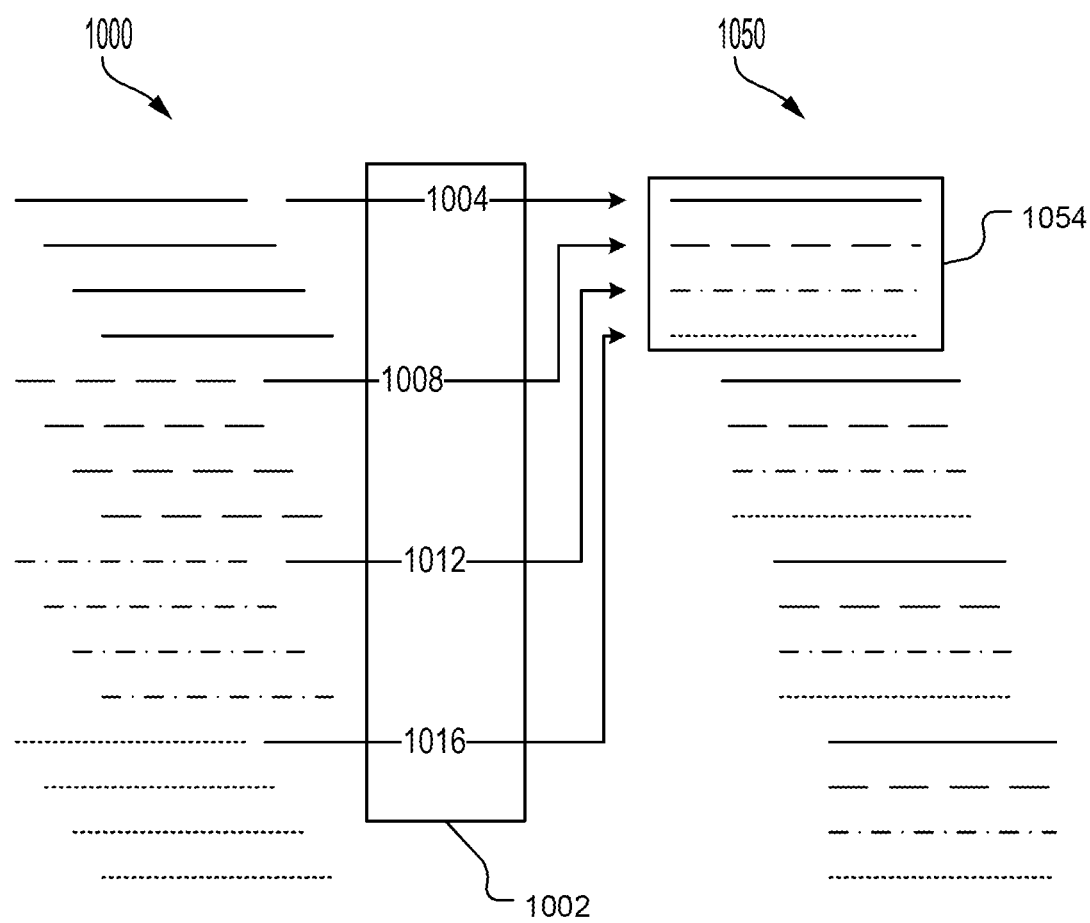
FIG. 10 is a block diagram of scan patterns with block scan framelets implemented by LIDAR sensor systems.

FIG. 7 depicts an example of a LIDAR sensor system 700 and a scan pattern that can be implemented by the LIDAR sensor system 700. The LIDAR sensor system 700 can incorporate features of the LIDAR sensor system 500 described with reference to FIGS. 5 and 6. The LIDAR sensor system 700 can output light in scan patterns that have greater scan resolution (i.e., more scan lines per given area or volume being scanned). This can enable the LIDAR sensor system 700 to have improved signal-to-noise ratio (SNR) and to detect smaller objects or features of objects. For example, the LIDAR sensor system 700 can output light in block scans in which transmitted beams from multiple channels of the LIDAR sensor system 700 are able to be more closely positioned relative to one another by more closely arranging transmit and receive elements of the channels. Referring briefly to FIG. 10, the LIDAR sensor system 700 can output light in a scan pattern 1050, in which transmit beams 1004, 1008, 1012, 1016 from separate channels are arranged more closely in a framelet 1054 as compared with scan pattern 1000, improving the scan resolution.

The LIDAR sensor system 700 can include a transmitter 705. The transmitter 705 can have a first side 707 and a second side 709. The transmitter 705 can receive a transmit beam 710 (e.g., various beams described with reference to FIGS. 5 and 6, such as beams 506, 522), and output the transmit beam 710. FIG. 7 depicts the path along which transmit beam 710 is received (e.g., from the laser source 504 or other components described with reference to FIGS. 5 and 6), such as a path of at least one of an optical fiber, a waveguide, or a free space path, and from which the transmitter 705 outputs the transmit beam 710.

The transmitter 705 can direct the transmit beam 710 to at least one of the optics module 524 or the scanning optics 532. The transmit beam 710 can include particular characteristics such as direction, polarization, or various combinations thereof. The transmitter 705 can output the transmit beam 710 at an angle relative to at least one of a direction along which the transmitter 705 receives the beam or a plane in which the transmitter 705 lies, such as an angle out of a longitudinal plane of a chip on which the transmitter 705 is provided.

The transmitter 705 can include at least one of a waveguide or a grating coupler to transmit the transmit beam 710. For example, the waveguide or the grating coupler can transmit light in a two-dimensional pattern, e.g., so that the transmit beam 710 has two polarizations. The transmitter 705 can output the transmit beam 710 to have a transmit polarization 706, such as linear polarization.

The LIDAR sensor system 700 can include a receiver 715. The receiver 715 can be positioned on the first side 707 of the transmitter 705. As depicted in FIG. 7, the receiver 715 can be spaced from the transmitter 705 by a distance greater than or equal to about 25 micrometers (µm) and less than or equal to about 130 µm. The receiver 715 can be spaced from the transmitter 705 by a distance greater than or equal to about 30 µm and less than or equal to about 50 µm, which can allow for increased angular resolution. The receiver 715 can be spaced from the transmitter 705 by a distance greater than or equal to about 30 µm and less than or equal to about 36 µm. For example, the midpoint of the receiver 715 can be spaced from the midpoint of the transmitter 705 by about 32 µm. As such, the spacing between transmit and receive components of the LIDAR sensor system 700 can be reduced relative to, for example, transmit and receive components operating with waveguide arrays that have predetermined or standard distances between waveguides of about 127 µm; in turn, resolution between transmitters/transmit beams of adjacent channels (e.g., channels 786, 788 as described further herein) can be reduced from about 0.29 degrees to about 0.08 degrees.

The receiver 715 can receive a first component 720 of the return beam 548 from reflection of the transmit beam 710 by an object (i.e. FIG. 7 depicts the return path of the first component 720 from the receiver 715 to other components, such as detector components, such as through an optical fiber coupled to an output side of the receiver 715). The return beam 548 can be a first return beam. The first component 720 of the return beam 548 can have a first polarization 717, such as linear or circular polarization. The receiver 715 can include at least one of a grating coupler or a waveguide, which can couple light, e.g., the first component 720 of the return beam 548, from free space onto a chip.

The LIDAR sensor system 700 includes a receiver 725. The receiver 725 can be positioned on the second side 709 of the transmitter 705, so that the transmitter 705 is between the receivers 715, 725. The receiver 725 can be spaced from the transmitter 705 by a same distance as the distance between the transmitter 705 and the receiver 715. The receiver 725 can be spaced from the transmitter 705 by a distance greater than or equal to about 25 µm and less than or equal to about 130 µm, or between about 30 µm and 50 µm to facilitate achieving a target angular resolution. For example, the receiver 725 can be spaced from the transmitter 705 by a spacing greater than or equal to about 30 µm and less than or equal to about 36 µm. For example, the midpoint of the receiver 725 can be spaced from the midpoint of the transmitter 705 by about 32 µm. As noted above, various such transmitter and receiver arrangements can allow for greater resolution of beams outputted by the LIDAR sensor system 700.

The receiver 725 can receive a second component 730 of the return beam 548 from reflection of the transmit beam 710 by an object. The return beam 548 can be the first return beam. The second component 730 of the return beam 548 can have a second polarization 727, which may be different than the first polarization 717 of the first component 720. For example, the second polarization 727 can be orthogonal to the first polarization 717. The receiver 725 can include at least one of a grating coupler or a waveguide, which can couple light, e.g., the first component 720 of the return beam 548, from free space onto a chip.

Referring further to FIG. 7, the LIDAR sensor system 700 can include a plurality of channels 786, 788, 790, 792, which can correspond to arrangements of respective transmit and receive components. As such, the LIDAR sensor system 700 can transmit and receive multiple signals (i.e., beams) using one or more of the channels 786, 788, 790, 792, enabling block scanning patterns with more closely arranged scan lines. Each particular channel of the plurality of channels 786, 788, 790, 792 can provide return beam signals to a same mixer, detector, or other signal processing component that uses the return beam signals as well as the transmit beam outputted by the transmitter of the particular channel. In other words, each respective channel 786, 788, 790, 792 can be defined by a particular transmitter (e.g., transmitter 705 of channel 786) that outputs a corresponding transmit beam (e.g., transmit beam 710) and particular receiver(s) (e.g., receivers 715, 725) that receive return beam(s) (e.g., components 720, 730), where the LIDAR sensor system 700 uses the corresponding transmit beam and the return beams to perform operations such as range, velocity, and/or Doppler detection with respect to an object.

For example, the LIDAR sensor system 700 can include a channel 786 (e.g., first channel), which can include the transmitter 705, the receiver 715, and the receiver 725, where the receivers 715, 725 are adjacent to the transmitter 705 (e.g., no other transmitters or receivers of other channels are between the receivers 715, 725 and the transmitter 705 of the channel 786).

As depicted in FIG. 7, the LIDAR sensor system 700 can include a channel 788 (e.g., second channel). The channel 788 can include a transmitter 750 (which can be similar or identical to the transmitter 705), a receiver 754 on a first side of the transmitter 750, and a receiver 758 on a second side of the transmitter 750; the receivers 754, 758 can be similar or identical to the receivers 715, 725. The transmitter 750 can output a transmit beam 752, and the receivers 754, 758 can receive respective first and second components 756, 760 of a return beam from reflection or other scattering of the transmit beam 752 by an object and direct the respective first and second components 756, 760 to detector(s) of the LIDAR sensor system 700. The transmitter 750 can output the transmit beam 752 at a second angle, which can be the same as or different from the first angle of the transmit beam 710.

The transmitters 705, 750 of adjacent channels 786, 788 can be spaced from one another by a distance that allows for lesser distance between transmit beams 710, 752. The transmitter 750 can be spaced from the transmitter 705 by a distance greater than or equal to about 75 μm and less than or equal to about 130 μm. The transmitter 750 can be spaced from the transmitter 705 by a distance greater than or equal to about 80 μm and less than or equal to about 120 μm, which can allow for increased angular resolution. For example, the transmitter 750 can be spaced from the transmitter 705 by a distance greater than or equal to about 90 μm and less than or equal to about 100 μm. For example, the transmitter 750 can be spaced from the transmitter 705 by a distance of about 95 μm.

Referring further to FIG. 7, the LIDAR sensor system 700 can include a channel 790 (e.g., third channel). The channel 790 can include a transmitter 762, a receiver 766 on a first side of the transmitter 762, and a receiver 770 on a second side of the transmitter 762; the receivers 766, 770 can be similar or identical to the receivers 715, 725. The transmitter 762 can be similar to or the same as the transmitter 705. For example, the transmitter 762 can include at least one of a waveguide or a grating coupler to transmit light in a two-dimensional pattern, e.g., polarization. The transmitter 762 can receive a beam (e.g., various beams described with reference to FIGS. 5 and 6) and output a transmit beam 764 with particular characteristics such as direction, polarization, or various combinations thereof. For example, the transmitter 762 can output the transmit beam 764 at a third angle. The third angle of the transmit beam 764 can be different from the first angle of the transmit beam 710. The receiver 766 can be between the receiver 758 and the transmitter 762. The receiver 766 receive a first component 768 of a return beam from reflection of the transmit beam 764 outputted by the transmitter 762. The receiver 770 can receive a second component 772 of the return beam from reflection of the transmit beam 764 outputted by the transmitter 762.

The transmitter 762 and receivers 766, 770 can have similar or identical distances relative to each other and to components of the channel 788 as the components of the channel 788 are arranged relative to each other and components of the channel 786. For example, the transmitter 762 can be spaced from the transmitter 750 by a distance greater than or equal to about 75 μm and less than or equal to about 130 μm; by a distance greater than or equal to about 90 μm and less than or equal to about 100 μm; such as a distance of about 95 μm. The receivers 766, 770 can each be spaced from the transmitter 762 by a distance greater than or equal to about 25 micrometers m and less than or equal to about 130 μm; by a distance greater than or equal to about 30 μm and less than or equal to about 36 μm; such as by about 32 μm.

Referring further to FIG. 7, the LIDAR sensor system 700 can include a channel 792 (e.g., fourth channel). The channel 790 can include a transmitter 774, a receiver 778 on a first side of the transmitter 774 between the transmitter 774 and the receiver 770, and a receiver 782 on a second side of the transmitter 774 opposite the receiver 778; the receivers 778, 782 can be similar or identical to the receivers 715, 725. The transmitter 774 can be similar to or the same as the transmitter 705. For example, the transmitter 774 can include at least one of a waveguide or a grating coupler to transmit light in a two-dimensional pattern, e.g., polarization. The transmitter 774 can receive a beam (e.g., various beams described with reference to FIGS. 5 and 6) and output a transmit beam 776 with particular characteristics such as direction, polarization, or various combinations thereof. For example, the transmitter 774 can output the transmit beam 776 at a fourth angle, which can be the same as or different from the first angle of the transmit beam 710.

The transmitter 774 and receivers 778, 782 can have similar or identical distances relative to each other and to components of the channels 788, 790 as the components of the channel 788, 790 are arranged relative to each other and components of the channels 786, 788, respectively. For example, the transmitter 774 can be spaced from the transmitter 762 by a distance greater than or equal to about 75 μm and less than or equal to about 130 μm; by a distance greater than or equal to about 90 μm and less than or equal to about 100 μm; such as a distance of about 95 m. The receivers 778, 782 can each be spaced from the transmitter 774 by a distance greater than or equal to about 25 micrometers μm and less than or equal to about 130 μm; by a distance greater than or equal to about 30 μm and less than or equal to about 36 μm; such as by about 32 μm. As a particular example, each transmitter and receiver of the LIDAR sensor system 700 can be at a distance from adjacent transmitter(s) and/or receiver(s), as appropriate, by about 32 μm, such that the transmitters of the channels 786, 788, 790, 792 are at distances of about 95 μm from the next transmitters.

Referring briefly to FIG. 6 and further to FIG. 7, the optics module 524, such as the circulator 608 of the optics module 524, can have a displacement axis by which the optics module 524 displaces return beams based on the polarization of the return beams. For example, the circulator 608 can include components such as optical displacers, Faraday rotators, wave plates, or various combinations thereof that displace and/or adjust the direction of travel of the return beams based on the polarization of the return beams, allowing for return beams to be directed to receivers of the LIDAR sensor system 700 on separate paths from transmit beams outputted by the LIDAR sensor system 700. To address time of flight delay arising from the round trip travel time of the transmit beam and the return beam, which can further alter the path along which the return beams are received and passed through the optics module 524, the optics module 524 can be oriented so that the displacement axis is rotated (e.g., relative to a baseline orientation in which the return beam is assumed to travel on the same path as the transmit beam). For example, the optics module 524

(or a displacer thereof) can be rotated about the axis of a respective transmit beam. In an example in which the transmitter to transmitter distance is about 95 μm, the transmitter to receiver distance is about 32 μm, and the waveguide distance is about 32 μm, the displacement axis rotation can be about 21.5 degrees, the polarization displacement of the optics module 524 can be about 32 μm (e.g., the waveguide spacing, transmitter to adjacent receiver distance, and polarization displacement can be about equal), and the thickness of a displacer of the optics module 524 can be 0.32 mm for YVO$_4$ and 0.94 mm for LiNbO$_3$.

The LIDAR sensor system 700 can include additional channels similar to or the same as the channels 786, 788, 790, 792. For example, the LIDAR sensor system 700 can include additional channels that can include at least one receiver and at least one transmitter. The additional channels can provide portions of the scan patterns outputted by the LIDAR sensor system 700 in a manner similar to or the same as the channels 786, 788, 790, 792.

Figure 8:
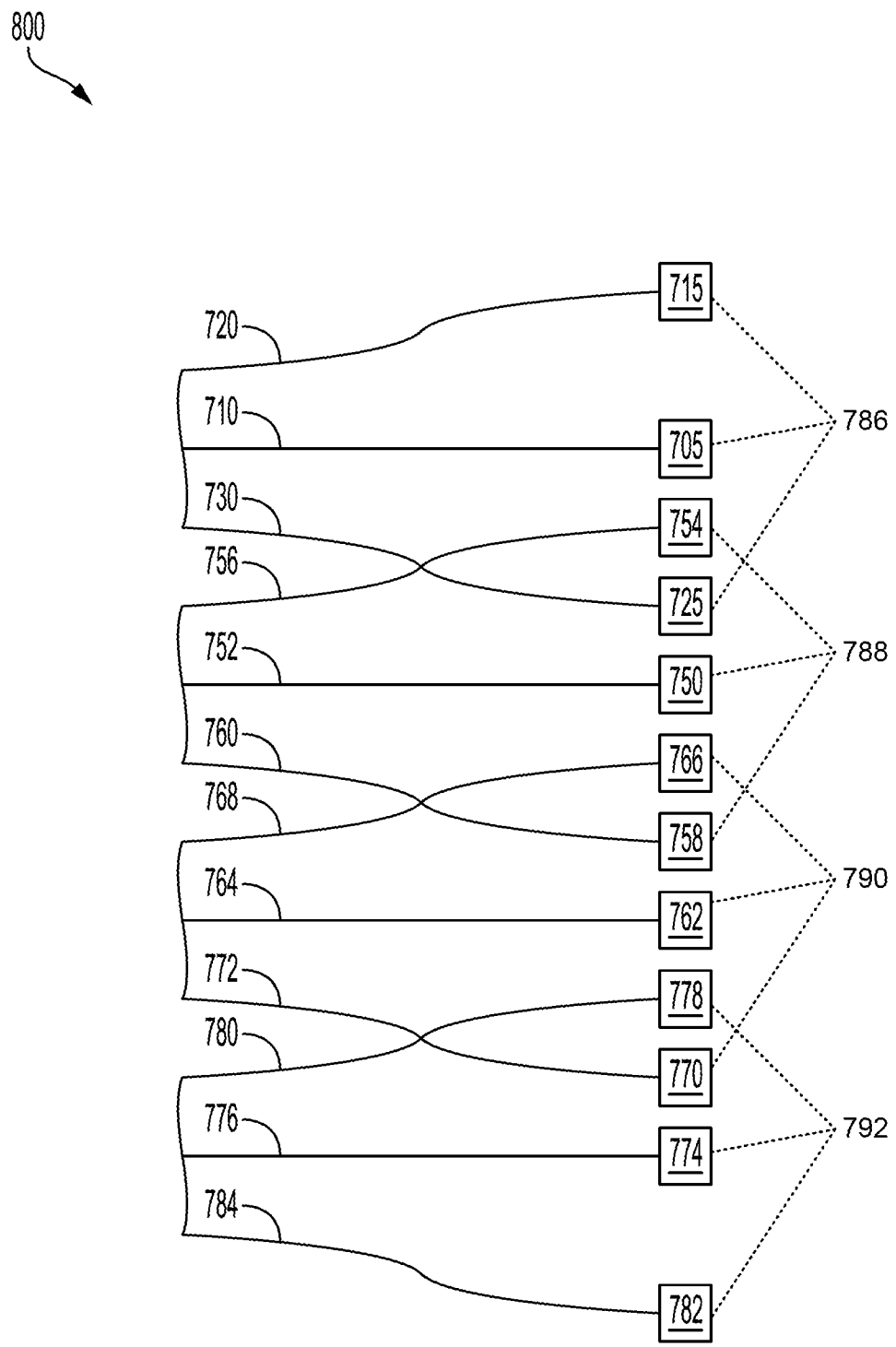
FIG. 8 is a block diagram of an example of a LIDAR sensor system to perform block scanning.

FIG. 8 depicts an example of a LIDAR sensor system 800. The LIDAR sensor system 800 can incorporate features of the LIDAR sensor system 800, while having an adjusted arrangement (relative to that of LIDAR sensor system 700) that allows for block scanning while having relatively greater distances between at least some transmitters/receivers, such as to enable the LIDAR sensor system 800 to be implemented with waveguides or other optical coupling elements with standardized sizing. For example, the receivers of LIDAR sensor system 800 can be arranged so that at least some of the receivers are not adjacent to corresponding transmitters, allowing for spacing between transmitters and receivers of the same channel to be increased. This can improve signal to noise ratio, such as by reducing the amount of circulator displacement axis rotation used to address a particular time of flight delay.

For example, at least one particular channel of the plurality of channels 786, 788, 790, 792 can be arranged such that a receiver of a different channel 786, 788, 790, 792 is between the transmitter and at least one receiver of the particular channel. In the example depicted in FIG. 8, the receiver 754 of channel 788 can be between the transmitter 705 and receiver 725 of channel 786; the receiver 725 of channel 786 can be between the receiver 754 and the transmitter 750 of channel 790; the receiver 758 of channel 788 can be between the receiver 766 and the transmitter 762 of channel 790; the receiver 766 of channel 790 can be between the transmitter 750 and the receiver 758 of channel 788; the receiver 770 of channel 790 can be between the receiver 778 and the transmitter 774 of channel 792; the receiver 778 of channel 792 can be between the transmitter 762 and the receiver 770 of channel 790.

In some implementations, a distance between transmitters of adjacent channels (e.g., between transmitter 705 and transmitter 750, between transmitter 750 and transmitter 762; between transmitter 762 and transmitter 774) can be between about 40 μm and about 200 μm. The distance can be between about 60 μm and about 150 μm. The distance be between about 75 μm and about 130 μm. The distance can be between about 90 μm and about 100 μm. The distance can be about 95 μm, such as 95.25 μm.

A distance between the transmitter and receiver of a particular channel (e.g., between transmitter 705 and receivers 715 and 725, etc.) can be between about 20 μm and about 130 μm. The distance can be between about 40 μm and about 85 μm. The distance can be between about 50 μm and about 70 μm. The distance can be between about 60 μm and about 68 μm. The distance can be about 64 μm, such as 63.5 μm.

Various such distances can be implemented, for example, with waveguides having spacings (i.e. distances between adjacent waveguides) of about 32 μm. In an example in which the transmitter to transmitter distance is about 95 μm, the transmitter to receiver distance (e.g., distance between a receiver and a transmitter of the same channel) can be about 63.5 μm, the waveguide distance can be about 32 μm, the displacement axis rotation can be about 9.7 degrees (less than that of the LIDAR sensor system 700, which can allow for improved signal to noise ratio), the displacement by the optics module 524 can be about 63.5 μm, the thickness of a YVO$_4$ displacer can be about 0.64 mm, and the thickness of a LiNbO$_3$ displacer can be about 1.88 mm.

Figure 9:
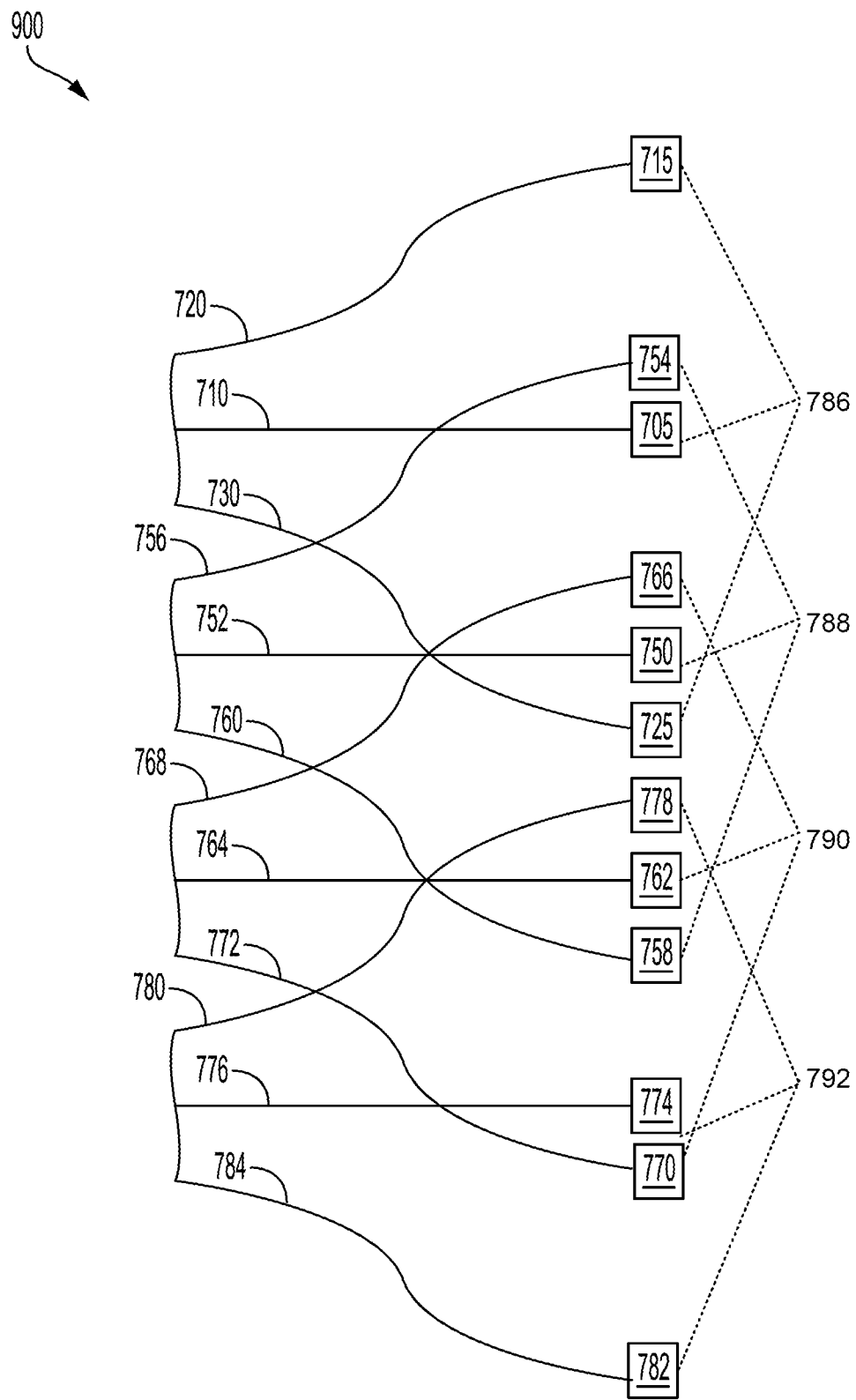
FIG. 9 is a block diagram of an example of a LIDAR sensor system to perform block scanning.

FIG. 9 depicts an example of a LIDAR sensor system 900. The LIDAR sensor system 900 can incorporate features of the LIDAR sensor system 800, 900, and can have relatively greater distances between receivers and the transmitters of the same channel as the receivers, such as to allow for the transmitters and receivers to be implemented with waveguides and/or fiber arrays having standardized spacings. For example, the LIDAR sensor system 900 can be implemented with waveguide spacings of 127 μm.

In the example depicted in FIG. 9, the receiver 754 of the second channel 788 can be between the transmitter 705 and the receiver 715 of the first channel 788; the receiver 766 of the third channel 790 can be between the transmitter 705 of the first channel and the transmitter 750 of the second channel; the receiver 725 of the first channel can be between the transmitter 750 of the second channel and the receiver 778 of the fourth channel; the receiver 778 of the fourth channel 792 can be between the receiver 725 of the first channel and the transmitter 762 of the third channel 790; the receiver 758 of the second channel can be between the transmitter 762 of the third channel 790 and the transmitter 774 of the fourth channel 792; and the receiver 770 of the third channel 790 can be between the transmitter 774 and the receiver 782 of the fourth channel 792.

In some implementations, a distance between transmitters of adjacent channels (e.g., between transmitter 705 and transmitter 750, between transmitter 750 and transmitter 762; between transmitter 762 and transmitter 774) can be between about 40 μm and about 200 μm. The distance can be between about 60 μm and about 150 μm. The distance be between about 75 μm and about 130 μm. The distance can be between about 90 μm and about 100 μm. The distance can be about 95 μm, such as 95.25 μm.

A distance between the transmitter and receiver of a particular channel (e.g., between transmitter 705 and receivers 715, 725, etc.) can be between about 60 μm and about 250 μm. The distance can be between about 90 μm and about 180 μm. The distance can be between about 110 μm and about 150 μm. The distance can be between about 130 μm and about 140 μm. The distance can be about 127 μm. For example, the LIDAR sensor system 900 can be implemented using a transmitter to transmitter distance of about 95.25 μm, a transmitter to receiver distance of about 127 μm, a waveguide spacing of about 31.75 μm, a displacement axis rotation of about 4.9 degrees, a displacement performed by the optics module 524 of about 127 μm, and a thickness of the displacer of the optics module 524 of about 1.28 mm using YVO$_4$ and 3.75 mm using LiNbO$_3$. As such, the LIDAR sensor system 900 can be used to perform block scanning without reducing performance associated with operation of the optics module 524.

FIG. 10 depicts an example of scan patterns 1000, 1050 that can be implemented using the LIDAR sensor systems 700, 800, 900 to perform block scanning, such as to improve small object perception. As illustrated in FIG. 10, in a scan pattern 1000, scan lines 1004, 1008, 1012, 1016 from respective channels (e.g., each resulting from a transmit beam from a particular channel of a plurality of channels) are outputted with relatively large distances (e.g., in elevation) between the scan lines 1004, 1008, 1012, 1016. The scan lines 1004, 1008, 1012, 1016 can form a framelet 1002 of the scan pattern 1000. An actuator, such as a galvanometer, can be used to adjust (e.g., step) the elevation of the scan lines 1004, 1008, 1012, 1016 for subsequent outputs of the transmit beams corresponding to the scan lines 1004, 1008, 1012, 1016, illustrated in FIG. 10 as the additional three sets of scan lines for each respective channel.

The LIDAR sensor systems 700, 800, 900 can implement the block scanning scan pattern 1050, in which a framelet 1054 is formed where the scan lines 1004, 1008, 1012, 1016 have relatively lesser distances between each other. The same overall field of view can be scanned using four framelets as the actuator adjusts the elevation over the course of the four framelets, but with greater angular resolution for each framelet. For example, the signal processing performed using the framelet 1054 can be used to determine range, velocity, and/or Doppler regarding an object that reflects or otherwise scatters return beams from the transmit beams of the scan lines 1004, 1008, 1012, 1016 of the framelet 1054, allowing for improved angular resolution of each framelet 1054.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A light detection and ranging (LIDAR) sensor system for a vehicle, comprising:
   a first transmitter configured to output a first transmit beam;
   a first receiver on a first side of the first transmitter, the first receiver configured to receive a first component of a first return beam from reflection of the first transmit beam by an object;
   a second receiver on a second side of the first transmitter, the second receiver configured to receive a second component of the first return beam;
   a second transmitter configured to output a second transmit beam, the second transmitter on the second side of the first transmitter, the second transmitter spaced from the first transmitter by a distance greater than or equal to 75 micrometers (μm) and less than or equal to about 130 μm; and
   one or more processors configured to determine at least one of a range to the object or a velocity of the object based on the first component, the second component, and a second return beam from reflection of the second transmit beam by the object.

2. The LIDAR sensor system of claim 1, wherein the first transmitter comprises at least one of a waveguide or a grating coupler.

3. The LIDAR sensor system of claim 1, the LIDAR sensor system further comprising:
   a third receiver on a first side of the second transmitter between the second receiver and the second transmitter; and
   a fourth receiver on a second side of the second transmitter opposite the first side of the second transmitter.

4. The LIDAR sensor system of claim 3, wherein the third receiver is configured to receive a third component of the second return beam and the fourth receiver is configured to receive a fourth component of the second return beam, and the one or more processors are configured to determine the at least one of the range or the velocity based on the first component, the second component, the third component, and the fourth component.

5. The LIDAR sensor system of claim 3, comprising a first channel comprising the first transmitter, the first receiver, and the second receiver, and a second channel comprising the second transmitter, the third receiver, and the fourth receiver.

6. The LIDAR sensor system of claim 3, wherein the first transmitter is configured to output the first transmit beam at a first angle, and the second transmitter is configured to output the second transmit beam at a second angle different from the first angle.

7. The LIDAR sensor system of claim 1, wherein the first component is associated with a first polarization and the second component is associated with a second polarization.

8. The LIDAR sensor system of claim 1, wherein:
   the first receiver is spaced from the first transmitter by a spacing greater than or equal to about 25 micrometers (μm) and less than or equal to about 130 μm.

9. An autonomous vehicle control system, comprising:
   a first transmitter configured to output a first transmit beam as a first scan line of a scan pattern and as a second scan line of the scan pattern;
   a first receiver on a first side of the first transmitter, the first receiver configured to receive a first component of a first return beam from reflection of the first transmit beam by an object;
   a second receiver on a second side of the first transmitter, the second receiver configured to receive a second component of the first return beam;
   a second transmitter configured to output a second transmit beam as a third scan line of the scan pattern, the second transmitter on the second side of the first transmitter, the third scan line between the first scan line and the second scan line; and
   one or more processors configured to:
      determine, based on the first component, the second component, and a second return beam from reflection of the second transmit beam, at least one of a range to or a velocity of the object; and
      control operation of an autonomous vehicle based on the at least one of the range or the velocity.

10. The autonomous vehicle control system of claim 9, wherein the one or more processors are configured to control operation of the autonomous vehicle based on the at least one of the range or the velocity to avoid collision with the object.

11. The autonomous vehicle control system of claim 9, further comprising:
   a third receiver on a first side of the second transmitter between the second receiver and the second transmitter; and
   a fourth receiver on a second side of the second transmitter opposite the first side of the second transmitter.

12. The autonomous vehicle control system of claim 11, wherein the third receiver is configured to receive a third component of the second return beam and the fourth receiver is configured to receive a fourth component of the second return beam, and the one or more processors are configured to determine the at least one of the range or the velocity based on the first transmit beam, the second transmit beam, the first component, the second component, the third component, and the fourth component.

13. The autonomous vehicle control system of claim 11, comprising a first channel comprising the first transmitter, the first receiver, and the second receiver, and a second channel comprising the second transmitter, the third receiver, and the fourth receiver.

14. The autonomous vehicle control system of claim 11, wherein the first transmitter is configured to output the first transmit beam at a first angle, and the second transmitter is configured to output the second transmit beam at a second angle different from the first angle.

15. The autonomous vehicle control system of claim 9, wherein the first component is associated with a first polarization and the second component is associated with a second polarization.

16. The autonomous vehicle control system of claim 9, wherein:
   the first receiver is spaced from the first transmitter by a spacing greater than or equal to about 25 μm and less than or equal to about 130 μm.

17. The autonomous vehicle control system of claim 9, wherein
the second transmitter is spaced from the first transmitter by a spacing greater than or equal to about 75 µm and less than or equal to about 130 µm.

18. An autonomous vehicle, comprising:
a LIDAR sensor system, comprising:
- a first transmitter configured to output a first transmit beam to provide a first scan line of a first framelet and a first scan line of a second framelet;
- a first receiver on a first side of the first transmitter, the first receiver configured to receive a first component of a return beam from reflection of the first transmit beam by an object;
- a second receiver on a second side of the first transmitter, the second receiver configured to receive a second component of the return beam;
- a second transmitter configured to output a second transmit beam to provide a second scan line of the first framelet, the second scan line between the first scan line of the first framelet and the first scan line of the second framelet; and
- one or more processors configured to determine at least one of a range to the object or a velocity of the object based on the first component and the second component;

a steering system;
a braking system; and
a vehicle controller configured to control operation of at least one of the steering system or the braking system based on the at least one of the range or the velocity.

19. The autonomous vehicle of claim 18, wherein the first transmitter is spaced from the first receiver by a spacing greater than or equal to about 25 µm and less than or equal to about 130 µm, the LIDAR sensor system further comprising:
- a third receiver on a first side of the second transmitter between the second receiver and the second transmitter; and
- a fourth receiver on a second side of the second transmitter opposite the first side of the second transmitter.

* * * * *